Jan. 12, 1965    L. A. OLLIVIER    3,165,262
PNEUMATIC COMPUTER

Filed July 15, 1963    2 Sheets-Sheet 1

INVENTOR.
LOUIS A. OLLIVIER
BY
ATTORNEYS

Jan. 12, 1965   L. A. OLLIVIER   3,165,262
PNEUMATIC COMPUTER

Filed July 15, 1963   2 Sheets-Sheet 2

(1) $m_2 F_2 = m_3 F_3$
(2) $F_1 = k m_2$
(3) $F_1 F_2 = c F_3$

Multiplication (Squaring):

Division (Square Root Extraction):

INVENTOR.
LOUIS A. OLLIVIER
BY
ATTORNEYS 3,165,262
PNEUMATIC COMPUTER
Louis A. Ollivier, Huntingdon Valley, Pa., assignor to Fischer & Porter Company, Warminster, Pa., a corporation of Pennsylvania
Filed July 15, 1963, Ser. No. 294,863
3 Claims. (Cl. 235—200)

This invention relates to pneumatic computers and has particular reference to a unit capable of performing to a high degree of accuracy such elementary mathematical operations as square root extraction, division, multiplication, squaring and setting of ratios, all in response to pressure with delivery of the result as a pressure. In association with other similar units it may, of course, perform more elaborate operations.

The use of pneumatic systems for measurement and control purposes is widespread because of its advantages, and it is frequently desirable to perform computations directly with pressures as variables without translation into electrical quantities or mechanical motions, forces, or the like. In accordance with the present invention there is provided a pneumatic computer having an accuracy better than ¼% of full scale range. The unit constituting the device is versatile in its operations, requiring only changes in external connections in accordance with results desired. Because nulling type operation is involved, disturbing factors are substantially eliminated.

Briefly stated, the computer operates by the application of forces produced in proportion to pressures to lever systems the positions of which are detected by relationships of nozzles and baffles with provision of feedbacks to maintain precise numerical relationships of various quantities involved.

The objects of the invention have to do with the accomplishment of the results generally indicated above, and will become more apparent from the following description, read in conjunction with the accompanying drawings, in which.

Figure 1:
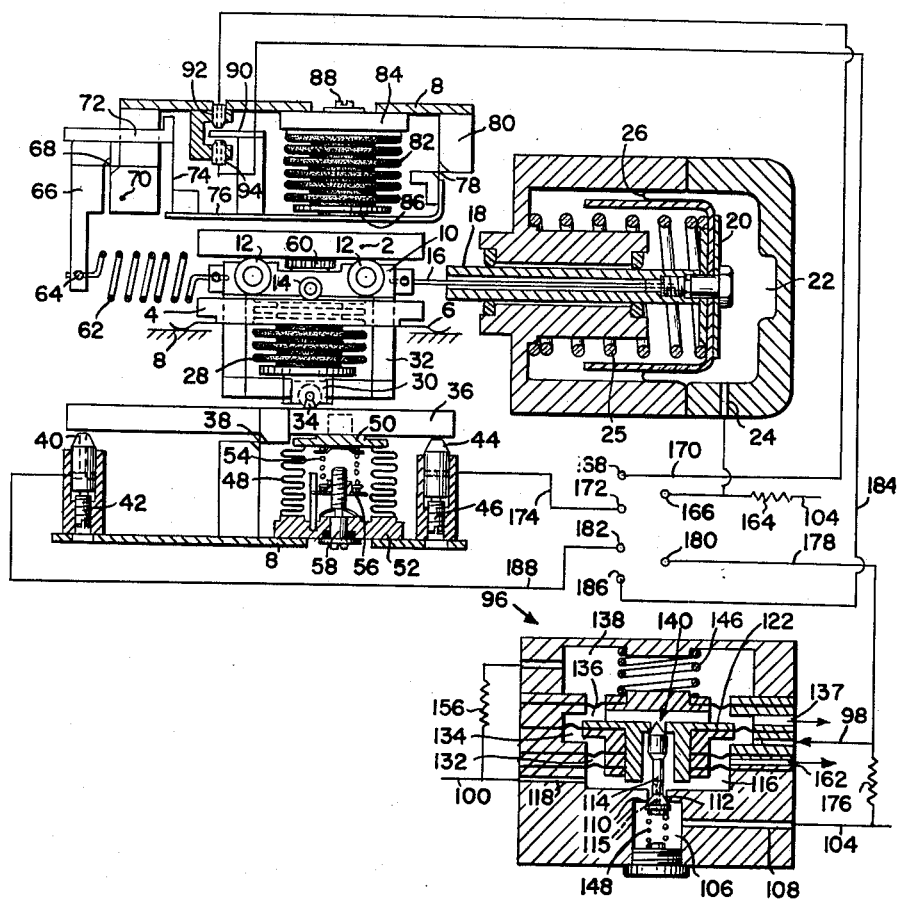
FIGURE 1 is a sectional and partially diagrammatic view showing the computer proper and an associated pneumatic relay and their connections.

Reference may be first made to FIGURE 1 for an understanding of the structural aspects of the computer and their particular relationship. A pair of fixed rails 2 cooperates with a pair of rails 4 urged upwardly by a pair of springs 6 reacting against portions of the frame 8 to guide for linear movement in a horizontal direction, as shown, a platform 10 having two pairs of rollers 12 bearing on rails 2 and a pair of central rollers 14 bearing on rails 4. A symmetrical double "three-point" arrangement is thus provided eliminating vertical play. It may be here noted that various significant parts of the frame are indicated by the numeral 8 and it will be understood that these parts are rigidly secured together by a framework the details of which are irrelevant.

The platform 10 is arranged to be reciprocated through a wire link connection 16 to a piston 18 which has a head 20 exposed to pressure in a chamber 22 provided with a pneumatic connection indicated at 24. A strong spring 25 urges the piston to the right and sealing is effected by means of a conventional rolling-type diaphragm 26 which folds variably upon itself during operation. The arrangement just described constitutes a powerful driving motor capable of readily overcoming frictional and other restraints, such as those of flexible connecting tubing, which thus become negligible in the operation of the platform.

The platform carries a bellows 28 the lower movable end 30 of which is guided for vertical movement in the frame 32 supported by the carriage, and engages the shaft of a roller 34 which provides contact at a definite point with respect to the length of a lever 36 having a plane upper face on which it bears.

The lever 36 is pivoted by a cross spring flexural mounting 38 on a support forming part of the frame 8. In view of the fact that only very minute movements of the lever 36 take place, this pivot has a substantially definitely fixed position.

The left-hand end of the lever 36 provides a baffle controlling air flow from the nozzle 40 which is adjustable in the direction of its axis by a screw stem 42. The right-hand of the lever 36 acts similarly as a baffle in cooperation with the similar nozzle 44 adjustable by its screw stem 46. As is known, baffles thus cooperating with nozzles will produce large changes of air flow rate for minute changes in spacing of baffles from nozzle outlets, and very accurate detection of angular position of lever 36 is thus provided.

Arranged to act upwardly at a fixed point of lever 36 to the right of the pivot 38 is a bellows 48, the movable end of which is secured at 50 to the lever while its fixed end 52 is mounted on the frame 8. For zero adjustment the compression of a spring 54 is adjusted by the arrangement of a non-rotatable nut 56 and a screw 58 journalled in the fixed end 52.

A similar zero adjustment is provided for the bellows, 28, and in this case the screw is provided with a knurled head 60 for convenient manipulation.

A tension spring 62 is secured at its right-hand end to the platform 10 and at its left-hand end at 64 to a lever 66 which has a cross-spring flexural pivot arrangement 68 to a block 70 carried by the frame. A lateral extension 72 of the upper end of lever 66 is connected by a flexural link 74 to the left-hand end of a lever 76 which has a cross-spring flexural mounting at 78 to a block 80 secured to the frame. A bellows 82 has a fixed end 84 secured to the frame and a movable end 86 secured to lever 76. The zero adjusting screw for this bellows is indicated at 88.

An upstanding portion of the lever 76 carries a baffle 90 arranged to move between a pair of nozzles 92 and 94 for control of the air flow from either as required by the external connections and use of the computer.

In association with the unit just described there is used the pneumatic relay generally designated 96.

The relay 96 receives an input pressure at 98 and provides an output flow of air at 100. While various types of relays may be used, a preferred form is that described in the application of Ollivier and Skitt, Serial No. 82,984, filed January 16, 1961, and a brief description thereof will be given to facilitate an understanding of the present invention.

Air is supplied to the system from a line 104 to a chamber 106 through a passage 108. This chamber 106 is in a base block of the relay which is formed by associated rings and other elements including diaphragms clamped between such elements. The chamber 106 has an opening provided with a lower edge 110 which forms a seat for a conical portion 112 of a valve member 114, which may close off free communication between the chamber 106 and a chamber 116 located thereabove, which latter is provided with a passage 118 providing air delivery to the output line 100. A bore 115 of small diameter in valve 114 provides a restricted continuous communication between chambers 106 and 116. Cooperating with the valve member 114 is a movable seat assembly 122 which is clamped in the central portions of a series of diaphragms, the peripheral portions of which are clamped between the disc-like elements of the relay including a cover. The pairs of diaphragms provide between them chambers indicated at 132, 134 and 136, while above the uppermost diaphragm and bounded by a cover there is the further chamber 138. This uppermost chamber forms a pneumatic capacity. The member 122 has an opening at its central portion providing a seat at 140 for the upper conical end of the valve member 114. Above this seat the opening communicates with the interior of the chamber 136. The chamber 136 is vented to atmosphere through the opening 137.

A spring 146 within the chamber 138 urges the assembly 122 downwardly, while a spring 148 urges the valve member 114 upwardly.

The chamber 116 is connected to the chamber 138 through a pneumatic resistance 156 which, as usual, may take the form of a restricted orifice. The input connection 98 communicates with the chamber 134.

A vent 162 connects the chamber 132 to atmosphere, this vent being provided merely to insure that the diaphragms bounding the chamber 132 always have their net pressure drops across them in the same direction to avoid snap action of the assembly.

The area of the top of the assembly 122 exposed to the pressure in chamber 138 is slightly less than the area of the bottom of the same assembly exposed to the pressure in chamber 116.

The operation of the relay unit just described is basically conventional, and reference may be made to said Ollivier and Skitt application for details, which are irrelevant, per se, to the matter of the present invention. It may be merely mentioned that a progressive increase of gain as a function of time is provided with complete stability and high rapidity of response.

Though various connections are duplicated in FIGURES 1 and 2, these connections and their functional aspects will be made most clear by reference primarily to FIGURE 2 in which the pneumatic connections are schematically diagrammed as single lines similar to those used in conventional schematic electrical diagrams. The mechanical elements are diagrammed and will be recognized by the corresponding numerals of FIGURES 1 and 2. The respective bellows 82, 28 and 48 are indicated as blocks providing forces $F_1$, $F_2$ and $F_3$ on the levers 76 and 36. The lever arm of the force $F_2$ with respect to the pivot 38 is indicated as $m_2$, while that the force $F_3$ is indicated as $m_3$. The respective bellows in the order above mentioned are connected to the pneumatic terminals $P_1$, $P_2$, and $P_3$. A similar terminal $P_0$ is connected to the output line 100 of relay 96. These terminals may take the form of nipples to which tubes may be connected, or, if rapid changes of connections are to be made, they may be provided by valve ports. Connection to the movable bellows 28 is made through flexible tubing offering negligible resistance to movement of the carriage 10.

The nozzles 92, 94, 40 and 44 are respectively designated for convenience of operational considerations as $N_1$, $N_2$, $N_3$ and $N_4$, and these latter designations are also applied to the respective terminals 168, 186, 182 and 172 connected to the nozzle orifices through tubes which are diagrammed at 170, 184, 188 and 174.

The supply line 104 is connected through pneumatic resistor 164 to the pneumatic terminal 166 designated also as D. This last terminal is connected through the passageway 24 to the cylinder 22 in which there moves the carriage-driving piston 20. The supply line 104 (duplicated for clarity in both FIGURES 1 and 2) is also connected through pneumatic resistance 176 to the input connection 98 of relay 96, and this connection is in turn connected at 178 to the pneumatic terminal 180, which is also designated as R.

Figure 2:
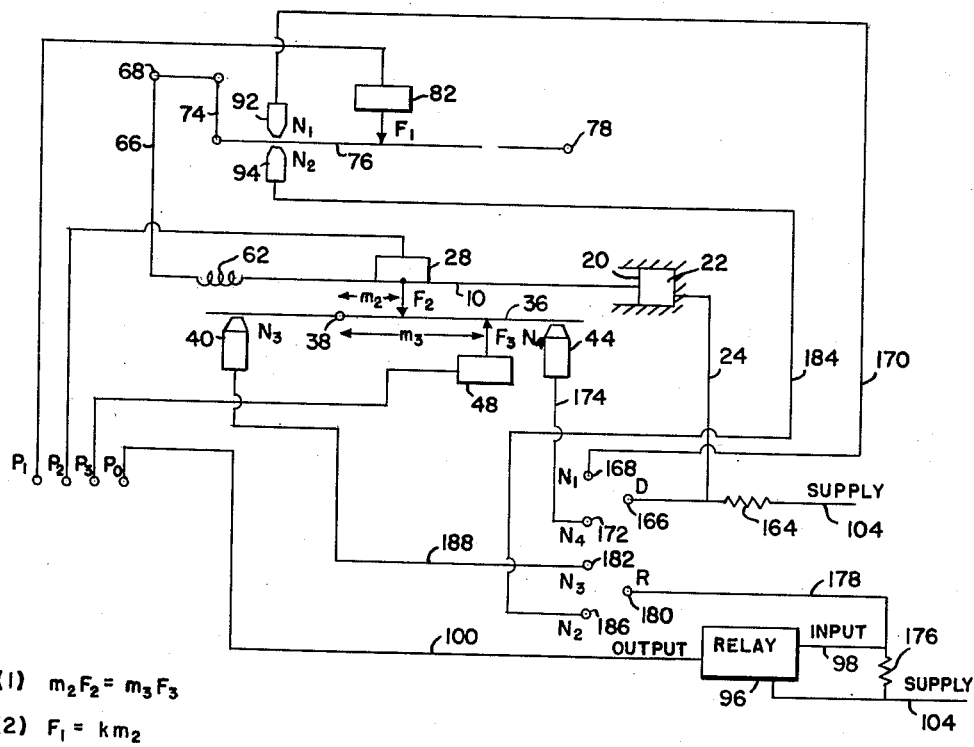
FIGURE 2 is a diagrammatic representation of the same provided for the purpose of facilitating understanding of operation, this figure also including explanatory equations.

As will shortly appear, the various pneumatic terminals are adapted to be selectively connected together for various operations, but at this time reference may be made to fundamental aspects of operation indicated in the equations forming part of FIGURE 2. As will appear hereafter, automatic operation effects balance of the lever 36 under the substantially sole actions of the forces $F_2$ and $F_3$, the pivot 38 offering negligible torque, and forces at the nozzles $N_3$ and $N_4$ being also negligible, with control actions effected by these nozzles in such fashion as to insure that balance locates the lever 36 at all times in substantially the same position. As is well known, nozzles and cooperating baffles are extremely sensitive to relative movements with development of a large variation of pressure for minute positional change. Considering this balance of the lever 36, therefore, Equation 1 holds to a high degree of accuracy.

Considering next lever 76, balance of this is effected by the action of the force $F_1$ opposed by the tension of spring 62, the mountings and connections being substantially free of torques. Lever 76 is sensitively detected as to a definite position by either nozzle $N_1$ or nozzle $N_2$ cooperating with the baffle forming part of the lever. Considering these matters, Equation 2 holds, $k$ being a constant in view of the fixed point of imposition of the force $F_1$. The force exerted by the spring 62 is, of course, linearly proportional to the lever arm $m_2$, adjustments of the parts being made to insure the condition expressed by this equation. Eliminating the variable $m_2$ from Equations 1 and 2, Equation 3 is obtained in which $c$ is a constant derived from $k$ and $m_3$.

The forces exerted by the bellows are linearly related to the pressures existing therein. However, in practical operation, it is not generally satisfactory to have the forces proportional to the actual pressures involved, either absolute or gauge. It is more generally desirable to have the range of pressure variation from, say, 3 to 15 pounds per square inch gauge. The settings of the bellows spring adjustments are accordingly made such that, for example, when the bellows 28 exerts a zero force on the lever 36, the actual pressure therein is 3 lbs. per square inch gauge. A gauge reading the pressure may then be calibrated with zero at what is actually 3 lbs. per square inch. Such matters of particular calibration and apparatus constants involved are irrelevant to the general theory of operation and will be readily understood as to be taken into account. It will be simpler to consider the relationship of forces, therefore, than actual pressures.

It will now be obvious that the fundamental Equation 3 will take care of the functional operations of multiplication and division depending upon choices of input and output.

Figure 3:
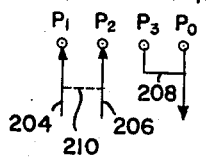
FIGURE 3 is a diagram indicating the connections involved in effecting multiplication and squaring.
Figure 3:
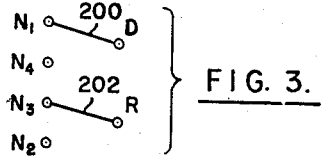
Figure 4:
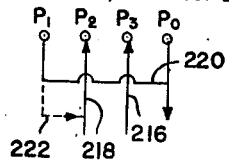
FIGURE 4 is a similar diagram indicating the connections involved in effecting division and square root extraction.
Figure 4:
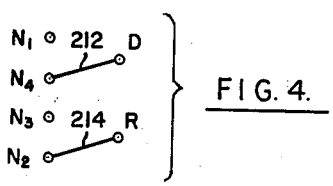

Considering first FIGURE 3, the full line interconnections are those provided for effecting multiplication. Terminal D is connected to terminal $N_1$ as indicated at 200, and terminal R is connected to terminal $N_3$ as indicated at 202. Input pressures are provided at 204 and 206 to the respective terminals $P_1$ and $P_2$. Terminals $P_3$ and $P_0$ are connected as indicated at 208 and output is taken from $P_0$. These connections, as already indicated, may be provided merely by selective arrangements of tubing or by adjustment of a multiple valve.

In this multiplication operation, variation of position of the lever 76 is detected by the nozzle $N_1$ which controls the pressure exerted on the driving piston 20, the cylinder of which is connected to the terminal D. Balance is effected by the variable tension thus imparted through the spring 62, the tension being proportional to $m_2$. The relay provides an output to the bellows 48 to vary the force $F_3$ to balance the lever 36, the position of which is detected by the nozzle $N_3$ controlling the input to the relay 96. The output pressure at $P_0$ is thus a measure of the product of the forces $F_1$ and $F_2$, in turn related to the input pressures $P_1$ and $P_2$.

Squaring is, of course, merely a special example of multiplication, and is effected by providing the same inputs at 204 and 206 by connecting the terminals $P_1$ and $P_2$ as indicated by the dotted connection 210.

For division, terminals D and $N_4$ are connected as at 212, and terminals R and $N_2$ are connected as indicated at 214. Piston 20 is then responsive to the detection of balance by the nozzle $N_4$, and the relay receives a signal from nozzle $N_2$ detecting the position of balance of the lever 76.

Input pressures are now provided at 216 and 218 to the terminals $P_3$ and $P_2$, respectively. The former represents the dividend, and the latter the divisor. Terminal $P_1$ is connected to terminal $P_0$ as indicated at 220, to provide the quotient output.

Square root extraction is merely a special case of division, effected by equating $F_1$ and $F_2$, and this result is achieved by the connection between terminals $P_1$ and $P_2$, effected as indicated by the dotted connection 222. The output of the relay thus provides the input at $P_2$.

The proportionality constant $c$ may be set by a choice of spring 62 and/or $m_3$ and/or bellows sizes. Generally speaking, this is set for a particular computer by choice of these elements, though, if desired, adjustments may be provided, as by provision for adjustment of $m_3$ by lateral adjustment of bellows 48 to apply its force $F_3$ at different positions along lever 36.

It will be evident that the computer which has been described may be associated with other computers in quite arbitrary fashions to provide complex computations. An input of one computer, for example, may be provided in the form of a ratio derived as the output of another similar computer. Terms may, of course, be added or subtracted merely by association with well known computer elements providing pressure outputs which are sums or differences of inputs. Complex polynomial functions may thus be provided.

Because of the fact that the output pressures may range well above atmospheric pressures, the outputs of the described computer may be used for direct control of valves or other elements or may operate various transducers, as well as giving rise to measurements. The possibility of vacuum operation (i.e. using subatmospheric pressures) rather than pressure operation will be evident. It will thus be seen that the computer element described is capable of a very wide range of uses.

It will be evident that various details of construction and operation may be modified without departing from the invention as defined in the following claims.

What is claimed is:

1. A fluid-responsive computer comprising:
means providing a guideway;
a member mounted by said guideway for movement therealong;
a fluid motor connected to said member to position the member along said guideway;
a movable element;
a first fluid operated means responsive to a fluid pressure to provide a force on said element;
means for detecting movement of said element;
a spring connected between said element and said member;
a second fluid operated means responsive to a fluid pressure and supported by said member for movement therewith;
a pivoted lever positioned for engagement by said second fluid operated means to receive therefrom a torque variable with the position of said member and with the fluid pressure to which the second fluid operated means is responsive;
a third fluid operated means responsive to a fluid pressure to provide a torque to said lever to balance the first mentioned torque;
means for detecting movement of said lever; and means interconnecting said fluid motor and said first, second and third fluid operated means and responsive to both of said detecting means to produce static equilibrium of said member, said element and said lever.

2. A computer comprising:
means providing a guideway;
a member mounted by said guideway for movement therealong;
a motor connected to said member to position the member along said guideway;
a movable element;
a first means responsive to an input to provide a force on said element;
means for detecting movement of said element;
a spring connected between said element and said member;
a second means responsive to an input and supported by said member for movement therewith;
a pivoted lever positioned for engagement by said second means to receive therefrom a torque variable with the position of said member and with the input to said second means;
a third means responsive to an input to provide a torque to said lever to balance the first mentioned torque;
means for detecting movement of said lever;
and means interconnecting said motor and said first, second and third operated means and responsive to both of said detecting means to produce static equilibrium of said member, said element and said lever.

3. A fluid-responsive computer comprising:
means providing a guideway;
a member mounted by said guideway for movement therealong;
a motor connected to said member to position the member along said guideway;
a movable element;
a first fluid operated means responsive to a fluid pressure to provide a force on said element;
means for detecting movement of said element;
a spring connected between said element and said member;
a second fluid operated means responsive to a fluid pressure and supported by said member for movement therewith;
a pivoted lever positioned for engagement by said second fluid operated means to receive therefrom a torque variable with the position of said member and with the fluid pressure to which the second fluid operated means is responsive;
a third fluid operated means responsive to a fluid pressure to provide a torque to said lever to balance the first mentioned torque;
means for detecting movement of said lever;
and means interconnecting said motor and said first, second and third fluid operated means and responsive to both of said detecting means to produce static equilibrium of said member, said element and said lever.

References Cited in the file of this patent

UNITED STATES PATENTS

| | | |
|---|---|---|
| 2,487,310 | Chandler | Nov. 8, 1949 |
| 2,521,477 | Pellettere | Sept. 5, 1950 |
| 2,747,595 | Dickey | May 29, 1956 |
| 3,012,401 | Harner | Dec. 12, 1961 |
| 3,072,326 | Rohmann | Jan. 8, 1963 |
| 3,085,744 | Sorteberg | Apr. 16, 1963 |

OTHER REFERENCES

Chapin, Donald W.: Apac, Instrument & Control Systems, vol. 35, pages 103–105, March 1962.